US010059027B2

(12) United States Patent
Gudsell et al.

(10) Patent No.: US 10,059,027 B2
(45) Date of Patent: Aug. 28, 2018

(54) METHODS OF TREATMENT OF LAMINATED TIMBER

(71) Applicant: Abodo Wood Limited, Auckland (NZ)

(72) Inventors: Daniel Jon Gudsell, Auckland (NZ); Benjamin Jeremy Rowland Campbell, Auckland (NZ)

(73) Assignee: ABODO WOOD LIMITED, Auckland (NZ)

( * ) Notice: Subject to any disclaimer, the term of this patent is extended or adjusted under 35 U.S.C. 154(b) by 36 days.

(21) Appl. No.: 15/148,362

(22) Filed: May 6, 2016

(65) Prior Publication Data

US 2016/0325460 A1  Nov. 10, 2016

(30) Foreign Application Priority Data

May 7, 2015 (NZ) ........................ 707743

(51) Int. Cl.
| | | |
|---|---|---|
| B27K 5/02 | (2006.01) |
| B32B 7/12 | (2006.01) |
| B27K 5/00 | (2006.01) |
| B32B 21/13 | (2006.01) |
| B32B 21/04 | (2006.01) |
| B05D 7/06 | (2006.01) |
| B27K 3/08 | (2006.01) |
| B27K 3/15 | (2006.01) |
| C08L 61/28 | (2006.01) |
| C08L 91/00 | (2006.01) |

(52) U.S. Cl.
CPC .............. *B27K 5/0085* (2013.01); *B05D 7/06* (2013.01); *B27K 3/08* (2013.01); *B27K 3/153* (2013.01); *B27K 5/007* (2013.01); *B27K 5/02* (2013.01); *B32B 7/12* (2013.01); *B32B 21/042* (2013.01); *B32B 21/13* (2013.01); *C08L 61/28* (2013.01); *C08L 91/00* (2013.01); *B27K 5/001* (2013.01); *B32B 2307/402* (2013.01); *B32B 2307/734* (2013.01); *B32B 2419/00* (2013.01)

(58) Field of Classification Search
CPC ........ B27K 5/02; B27K 5/0085; B32B 21/13; B32B 21/14; B32B 3/00; B32B 7/00; B32B 7/12; B32B 21/042
See application file for complete search history.

(56) References Cited

FOREIGN PATENT DOCUMENTS

| | | |
|---|---|---|
| NZ | 562263 | 5/2009 |
| NZ | 601245 | 12/2012 |
| NZ | 707743 | 8/2016 |

OTHER PUBLICATIONS

Elements Vulcan Thermally Modified Timber product information, Fact Sheet 14, Jul. 14, 2014, 1 page.

*Primary Examiner* — Linda L Gray
(74) *Attorney, Agent, or Firm* — Wenderoth, Lind & Ponack, L.L.P.

(57) ABSTRACT

The invention relates to methods to thermally treat wood (e.g., flat-grain timber) to produce wood with enhanced color and/or weathering properties.

15 Claims, 9 Drawing Sheets

METHODS OF TREATMENT OF LAMINATED TIMBER

The present application claims priority to priority application NZ707743, filed May 7, 2015, which is herein incorporated by reference in its entirety.

TECHNICAL FIELD

The invention relates to methods to thermally treat wood (e.g., flat-grain timber) to produce wood with enhanced color and/or weathering properties.

BACKGROUND ART

Softwood species including *radiata* pine ("*radiata*"), southern yellow pine, scots pine, ash, maple, beech, birch, aspen and rubber wood are used in a number of exterior construction applications such as structural members (for example, weight bearers and joists), decking and cladding. Many softwood species, and especially *radiata*, have disadvantages including lack of dimensional stability in service "stability", surface checking and poor colour/aesthetics following exposure. These have resulted in softwood timbers being unable to compete in some market applications with more durable and aesthetically pleasing timbers such as Western Red Cedar for cladding and hardwoods such as Kwila (also known as Merbau), for decking. Consequently, some softwood species and *radiata* pine in particular are viewed as a low-cost commodity material for decking and cladding applications.

When used for decking applications, low cost species such as *radiata* are often supplied in a form known as "wet, treated" which is very prone to shrinkage as the moisture content of the timber equilibrates to the surrounding conditions. This shrinkage results in unsightly dimensional changes. Furthermore, *radiata* in particular is not perceived to have pleasing aesthetics in its natural state. However, painting to overcome the lack of aesthetics is not practical for decking applications. Coatings and stains can be applied but these add cost and inconvenience. As a result of these disadvantages, *radiata* pine in a "wet, treated" format is not considered a premium decking material and is often seen as a cheap decking option by the market.

In cladding applications *radiata* is generally painted, typically with lighter colours. Painting not only results in a better surface finish, but it also ensures increased stability of the timber and enhances its aesthetic appeal. This is because, if it is not painted, the *radiata* used for cladding, like the "wet, treated" timber in decking applications, is not always stable and has a propensity to distort (or "warp") and surface check when exposed to varying climatic conditions.

Use of some softwood species (*radiata* in particular) in cladding and decking applications does, however, have some advantages, particularly over the hardwoods. These advantages typically relate to cost and to environmental concerns. For example, harder, more durable species (often hardwoods) are often slow growing and exist within naturally-occurring tropical forests resulting in environmental concerns amongst the general public. By comparison, softwood species such as *radiata* can be grown as plantation species which are quick growing, continually re-forested and, as such, sustainably grown. *Radiata* or other plantation species are also readily available in most countries. The rapid growth rate of such plantation species compared to non-plantation species such as hardwoods means the trees can be harvested earlier and this, along with ready availability, leads to cost benefits. In addition, prices of many hardwood species are increasing around the world due to their declining availability.

The use of preservatives and timber modification techniques are known to provide means for increasing the durability of soft woods such as *radiata*. These techniques are well known and provide options individually or together in combination to increase the durability of softwoods such as *radiata*.

To improve the stability of timber, it is known to laminate individual boards together. It is known in the art that boards with a vertical grain orientation are more resistant to warping, splitting and surface checking and are thus more stable when used. Laminated wooden boards are typically produced by gluing together individual boards in a flat grain orientation edge to edge or face to face to give individual finished boards with a flat or mixed grain orientation. However, lamination in this way typically results in finished boards of flat or mixed grain orientation that are more prone to surface checking and movement. It also results in unsightly glue lines in the finished product. An example of such lamination techniques is shown in NZ 562263 to Lockwood Buildings Limited.

It is an object of the present invention to provide a method of using timber boards with a substantially flat grain to produce a thermally modified timber product with enhanced dimensional stability and aesthetic characteristics, or at least to provide the public with a useful choice.

SUMMARY OF THE INVENTION

In some embodiments, provided herein are methods of treating wood comprising: a) thermally treating moisture reduced wood at temperature of about 205-245 C for about 1.5 to 6.0 hours to generate thermally treated wood, wherein the moisture reduced wood has a moisture content of less than about 1%; and b) cooling and hydrating the thermally treated wood such that modified wood is generated, wherein the modified wood has a moisture content of about 4-10 percent.

In certain embodiments, the methods further comprise a step before step a) of heating original wood (e.g., sawn timber) to a temperature of about 115 to 145 C to reduce the moisture content of the wood to generate the moisture reduced wood.

In further embodiments, the thermally treating the moisture reduced wood is at a temperature of about 215-225 C.

In other embodiments, the thermally treating the moisture reduced wood is for a time of about 2.5 to about 3.5 hours.

In some embodiments, the moisture reduced wood has a moisture content of about 0%.

In other embodiments, the thermally treating moisture reduced wood is performed in a Kiln or other heating device.

In particular embodiments, the cooling (e.g., to room temperature) and hydrating is performed in the kiln. In certain embodiments, the conditions (e.g., moisture and temperature) inside the kiln are computer controlled to ensure the proper moisture content of the finished wood.

In some embodiments, the cooling and hydrating comprising providing steam to the wood.

In further embodiments, the modified wood has a moisture content of about 6.5 to 7.5%.

In additional embodiments, the moisture reduced wood is a soft wood.

In additional embodiments, the modified wood is laminated to other wood similarly treated to create a laminated board comprising a glue line.

In particular embodiments, the laminated board is sawn perpendicular to the glue line.

In other embodiments, the moisture reduced wood is a species selected from the group consisting of: *radiata* pine, southern yellow pine, scots pine, ash, maple, beech, birch, aspen or rubber wood.

In certain embodiments, the methods further comprise treating the laminated board to add one or more striations.

In other embodiments, the modified wood has a lightness L-value of less than 62 as measured by the CIELAB Color Space.

In certain embodiments, the contrast in lightness between layers in the laminated board is less than L=10 when assessed using the CIELAB colour space.

In some embodiments, the laminated board is coloured to mimic the colour of a different wood.

In additional embodiments, the different wood is Western Red cedar, Kwila, Teak, Vitex, Ipe, Balau or Bankirai.

In some embodiments, provided herein are articles of manufacture comprising the modified wood generated by the methods described herein.

In one aspect the invention provides a method of using timber boards with a substantially flat grain to produce a laminated board with enhanced dimensional stability and aesthetic characteristics, the method comprising:
 a. taking at least two timber boards originally cut from a tree in a substantially flat grain orientation;
 b. laminating a flat grain face of each board together by gluing to produce a laminated block;
 c. cutting the laminated block substantially perpendicular to the grain to produce laminated boards comprising a front and back face having the appearance of a substantially vertical grain and showing at least one glue line
 wherein the method comprises treatment and colouring of the timber boards, laminated block or laminated boards by thermal modification.

In a particular embodiment, the method further comprises surface finishing comprising the addition of one or more striations to the front or back face of the laminated boards.

In a particular embodiment, the addition of one or more striations reduces visibility of at least one glue line.

In a particular embodiment, thermal modification reduces visibility of at least one lamination glue line.

In a particular embodiment, thermal modification reduces contrast between two or more lamination layers.

In certain embodiments of the methods and compositions therein, the contrast in lightness between layers in the laminated board is less than L=10 when assessed using the CIELAB colour space (e.g., 10% less . . . 20% less . . . 50% less . . . or 80% less than L=10).

In a particular embodiment, thermal modification is carried out at a temperature between 180° C. and 240° C. (e.g., 180 . . . 195 . . . 220 . . . and 240° C.).

In a particular embodiment, thermal modification is carried out for a period between 1 and 6 hours (e.g., 1 . . . 3 . . . 5 . . . and 6 hours).

In a particular embodiment, thermal modification is carried out at a temperature between 180° C. and 240° C. for a period between 1 and 6 hours.

In a particular embodiment, thermal modification is carried out at a temperature between 200° C. and 240° C. for a period of between 2 and 4 hours.

In a particular embodiment, thermal modification is carried out at between 200° C. and 240° C.

In a particular embodiment, thermal modification is for a period of between 2.5 and 3.5 hours or approximately 3 hours.

In a particular embodiment, the lightness L-value of the board is reduced by thermal modification to less than 62 (e.g., 61 . . . 55 . . . 40 . . . 25), as measured by the CIELAB Color Space.

In a particular embodiment, the thermal modification step provides preservative properties to the timber. In a particular embodiment, the method of processing timber does not include the step of treating the timber with a chemical preservative compound (e.g., the produced timer is added preservative-free).

In a particular embodiment, the timber comprises a softwood or a hardwood species. In a particular embodiment, the timber comprises *radiata* pine, southern yellow pine, scots pine, ash, maple, beech, birch, aspen or rubber wood.

Colouring the timber is achieved by at least one of:
 (i) thermal modification;
 (ii) furfuryl modification;
 (iii) resin impregnation;
 (iv) use of a colourant;
 (v) use of a preservative that has an inherent colour due to its chemistry e.g. alkaline copper quaternary (ACQ).

Preferably, thermal modification is carried out prior to lamination. Preferably, thermal modification is carried out prior to applying a preservative.

Preferably the surface finishing comprises the addition of striations selected from the group consisting of less than 2.5 mm width, less than 1 mm width, approximately 2.5 mm width and approximately 1 mm width.

Preferably, the step of colouring the timber is achieved by carrying out the step of treating the timber using thermal modification.

In a further embodiment, the timber may undergo one or more further treatments to increase surface hardness, dimensional stability and/or durability. Suitable treatments include furfuryl modification and resin impregnation.

In a particular embodiment, lamination to produce the appearance of a vertical grain orientation on a surface of the timber comprises:
 i. taking at least two boards originally cut from a tree in a substantially flat grain orientation;
 ii. laminating a flat grain face of said boards together by gluing to produce a laminated block;
 iii. cutting the laminated block substantially perpendicular to the grain to produce individual boards with the appearance of a substantially vertical grain orientation.

Preferably the colourant is a naturally occurring pigment or a dye. Preferably the colourant is not chemically synthesized.

Preferably the surface of the timber is finished using striations that are produced by at least one of:
 (i) a band-sawn effect, preferably applied during band sawing of the laminated block into individual boards;
 (ii) a micro-reed effect, preferably applied during profiling of the boards in a timber planar operation;
 (iii) a brushed effect, preferably applied using a brushing tool. Preferably, the brushing tool is a metallic brushing tool that is a stand-alone piece of equipment or has been adapted to be used in a stand-alone timber planar operation.

In a further aspect, the invention provides a laminated timber product produced by any of the above methods.

In a further aspect the invention provides a laminated timber product with enhanced dimensional stability and aesthetic characteristics wherein:

a. the timber has undergone thermal modification.
b. the product is laminated and cut to produce the appearance of a vertical grain orientation on a face of the timber; and
c. the timber has been coloured.

In a further aspect the invention provides a timber product wherein:
a. the timber has undergone thermal modification.
b. the product is produced from boards originally cut from a tree in a substantially flat grain orientation that have been laminated and cut perpendicular to the grain to give the appearance of a vertical grain orientation on a face of the timber, wherein the face of the timber shows laminated layers divided by glue lines; and
c. the timber has been coloured.

In a particular embodiment, the surface of the laminated timber product has a surface finish comprising one or more striations.

In a particular embodiment, the thermal modification process preserves the timber.

In a particular embodiment, the timber product comprises a softwood or a hardwood timber species. In a particular embodiment, the timber comprises *radiata* pine, southern yellow pine, scots pine, ash, maple, beech, birch, aspen or rubber wood.

In a further aspect, the invention provides a method of processing timber to enhance the dimensional stability and aesthetic characteristics of the timber, the method comprising the steps of;
a. treating the timber using thermal modification;
b. colouring the timber; and
c. lamination to produce the appearance of a vertical grain orientation on a face of the timber.

In a further aspect, the invention provides a laminated timber product wherein
the surface of the timber has a surface finish comprising striations to disguise or reduce the visibility of one or more glue lines from the lamination process; and wherein
the timber is coloured to mimic the colour of a different wood; and wherein
the timber is thermally modified.

The invention may also be said broadly to consist in the parts, elements and features referred to or indicated in the specification of the application, individually or collectively, in any or all combinations of two or more of said parts, elements or features.

Further aspects of the invention, which should be considered in all its novel aspects, will become apparent to those skilled in the art upon reading of the following description which provides at least one example of a practical application of the invention.

DESCRIPTION OF THE FIGURES

Embodiments of the invention will now be described, by way of example only, with reference to the accompanying drawings in which.

DETAILED DESCRIPTION

Definitions

"Softwood" means wood from gymnosperm trees. Gymnosperms reproduce by forming cones which emit pollen to be spread by the wind to other trees. Pollinated trees form naked seeds which are dropped to the ground or borne on the wind so that new trees can grow elsewhere. Some examples of softwood include pine, redwood, douglas-fir, cypresses and larch.

"Hardwood" means wood from angiosperm trees. Angiosperms produces seeds with some sort of covering such as a shell or a fruit. Angiosperms usually form flowers to reproduce. Birds and insects attracted to the flowers carry the pollen to other trees and when fertilized the trees form fruits or nuts and seeds. Hardwoods include eucalypts, beech and blackwood.

Figure 17:
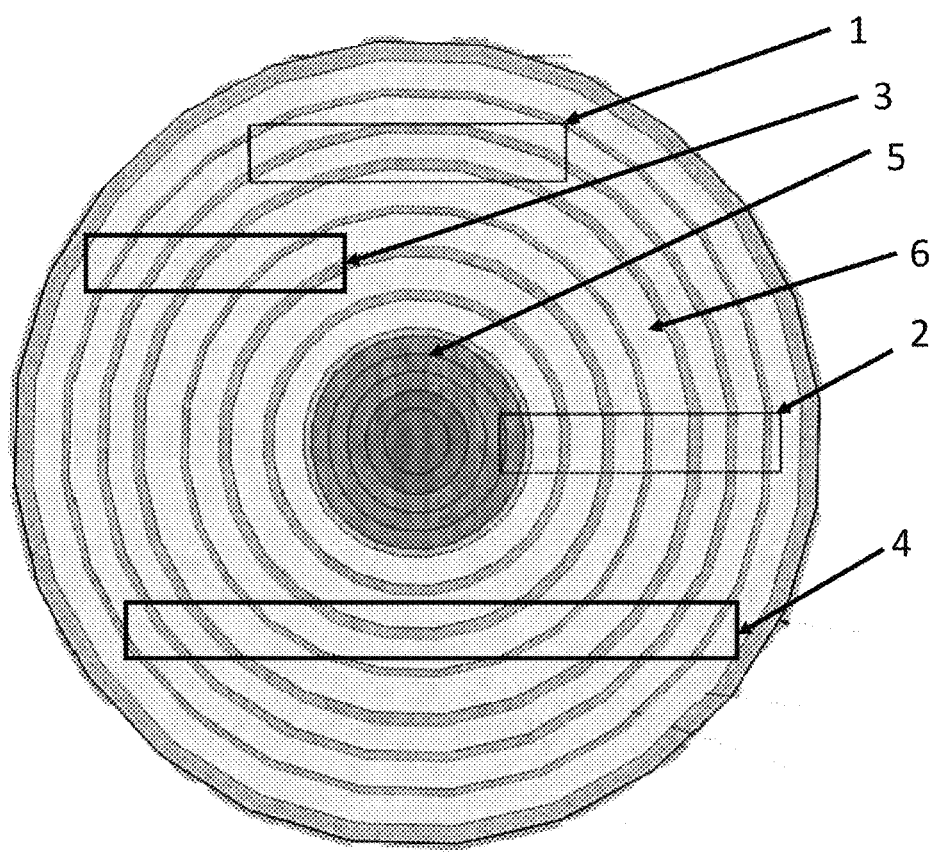
FIG. 17 shows timber sawn from a tree with flat grain 1, vertical grain 2, rift sawn 3 and mixed grain 4).

A "board" is defined as a piece of timber sawn from a tree with a width greater than a depth, and a length greater than the width. The face of the board is defined as a plane with edges defined by the width and the length of the board. A cross sectional view of the board through the width and depth axis will typically be substantially rectangular. Boards may be cut from the tree in a variety of orientations as shown in FIG. 17 and described in further detail below.

"Dimensional stability" or simply "stability" means the degree of resistance to deformation, expansion or shrinkage that can result from changes in conditions such as temperature and humidity.

"Durability" means the degree of resistance to decay as a result of fungal or microorganism growth and degradation.

"Aesthetic characteristics" means the visual appearance of the timber, taking into account the colour, texture, presence of glue lines, contrast between lamination layers and grain orientation.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The present invention is directed to a method for processing flat grain timber to improve the stability and aesthetic characteristics of the timber. Flat grain timber has a lower value than vertical grain timber and in its natural state has the tendency to lack dimensional stability. The inventors have developed an improved method of processing flat grain laminated timber to yield a product with enhanced weathering performance, dimensional stability and aesthetic qualities when compared to previous laminated timber products. One key reason for this is to be able to mimic the appearance and stability characteristics of more expensive hardwood timbers. The method is applicable to modify any species to impart more desirable aesthetic/stability properties. In particular embodiments, the processed timber is a softwood species. By way of example, the timber is selected from the group consisting of *radiata* pine, southern yellow pine, scots pine, ash, maple, beech, birch, aspen or rubber wood.

Production of flat-grain laminated timber is extremely limited due to the need to process the wood and the cost this adds to the final product. For high throughput timber operations this is undesirable and adds cost to what is a commodity product. The inventors have recognised that there may be niche market for sustainably products produced from flat-grain timber. From an economic point of view, the upgrading of lower value materials to higher value niche products is desirable for smaller scale producers. A further reason for lack of use of flat grain laminated timber is the undesirable effect of visible glue lines, and the contrasting colour tone between the layers in the laminated boards. The inventors have carried out testing of different methods to mitigate these drawbacks and found that they can be effectively addressed by thermal modification of the wood and optionally the addition of striations and/or coloured glue to reduce the visibility of the glue lines.

The inventors have also surprisingly found that thermal modification of flat grain laminated timber provides a product with increased stability and a lower propensity to delaminate during prolonged exposure. The thermal modification step combines with the lamination step to prevent deterioration of the timber and provide stability more akin to more expensive hardwoods often harvested unsustainably from primary forests. The tendency for partial delamination to occur in thermally modified timber is reduced when compared to preservative treated timber.

Colouring enhances the aesthetic characteristics of the wood by mimicking the appearance of more expensive timbers, and reducing the visibility of the glue lines produced by the lamination process. The inventors have therefore provided a complete solution to the problem of using flat grain timber from cheaper, sustainably grown, mainly softwood species (e.g. *radiata*) in place of more desirable vertical grain timber or timber from (often more expensive) predominantly hardwood species.

The invention provides a method of processing timber comprising thermal modification, colouration and lamination. In some embodiments, surface treatment capable of resulting in striations acts to further camouflage the lamination glue lines. One overall effect of the method is to mimic Western Red Cedar, Kwila, Teak, Vitex, Ipe, Balau, Bankirai or other commonly used hardwood timbers. The processed timber can therefore be safely used in outdoor applications, such as decking or cladding, in place of these species of timber. Since most chemical preservatives are toxic, the timber of the present invention (when not treated with a chemical preservative compound) is acceptable for uses that have strict safety standards such as children's play equipment, cladding and decking, and in sustainable building design. Further, the use of cheaper, lower grade timber is made possible by the lamination process which makes use of the less desirable cuts of wood from a tree. Coupled with the ease of disposal of the non-preservative treated timber, the invention provides an important advance in the timber industry and an important resource for sustainable and safe structures.

Accordingly, in a first aspect, the invention provides a method of using timber boards with a substantially flat grain to produce a laminated board with enhanced dimensional stability and aesthetic characteristics, the method comprising:
 a. taking at least two timber boards originally cut from a tree in a substantially flat grain orientation;
 b. laminating a flat grain face of each board together by gluing to produce a laminated block wherein each board comprises a laminated layer;
 c. cutting the laminated block substantially perpendicular to the grain to produce laminated boards comprising a front and back face having the appearance of a substantially vertical grain and showing at least one glue line
 wherein the method comprises treatment and colouring of the timber boards, laminated block or laminated boards by thermal modification.

One important aspect of the invention is the ability to use flat grain boards to achieve the appearance of a vertical grain on the face of the board. Flat grain timber is generally less valuable and less desirable than vertical grain timber due to its increased tendency to warp, split and surface check during use. The invention therefore provides the user with a method of extracting more value from a finite resource and contributing to the sustainable use of land and forests.

Lamination provides enhanced stability to the timber product (i.e. the laminated board) which cannot be achieved by thermal modification alone as well as a more aesthetically pleasing appearance of a vertical grain orientation when cut to achieve that effect. The invention relates to timber boards which are originally cut from a tree with a substantially flat grain orientation. FIG. 17 shows the timber sawn from a tree with flat grain 1, vertical grain 2, rift sawn 3 and mixed grain 4). Each board is cut along a plane defined by the width and depth, the length of board extending along the log. The width of the cuts in FIG. 17 being greater than the depth. The length of the board may be any length. A substantially flat grain orientation means any board with annual rings from 0° to 35° to the edge of the board. A riftsawn board has annual rings from 35° to 65° to the edge of the board and a vertical grain (or quartersawn) board has annual rings from 65° to 90° to the edge of the board. It will be appreciated by those of skill in the art that the laminated boards claimed as the invention will be composed of a majority of flat grain timber. However, in certain embodiments, there may be up to 20% of a cross section width of the final laminated boards that is made up of rift sawn or vertical grain timber. At least two flat-grain boards are laminated together by gluing to form a laminated block wherein each original board comprises a laminated layer. The block is then cut substantially perpendicular to the grain to produce individual laminated boards. Each laminated board comprises a front and a back face showing at least one glue line between the laminated layers and said faces have the appearance of a substantially vertical grain orientation. This technique produces boards with glue lines at the join of each original board which extend along the length of the laminated board. Timber processed in this way is more resistant to warping, splitting and surface checking and therefore more stable when used. The methods of the invention may comprise lamination with a coloured, colourless or tinted glue to produce the appearance of a vertical grain orientation on the face of the board.

In general, it is important that the boards being laminated are appropriately selected and aligned or arranged so that the surface of the final cut board has a vertical grain appearance. However, the lamination process typically results in the appearance of unsightly glue lines in the final cut timber product. Thermal modification and striations as described below help to mitigate this problem and thus further increase the value of the timber product. Other ways to mitigate the unsightly glue lines are to use a colourless glue is employed during the lamination process. Alternatively, a glue tinted to substantially match the colour of the thermally modified timber product can be employed. Examples of suitable colourless glues include polyurethanes, isocyanates and melamine-urea formulations. To achieve the desired tint in the glue a suitably coloured dye or pigment would be added to the glue. The dye or pigment used may not necessarily be the same dye or pigment used to colour the wood as the chemistry of the wood versus the glue is different.

Timber modification processes are processes that result in modification of the structure of the wood and result in increased resistance to degradation by fungi, insects, bacteria and/or algae. Typically the timber modification process does not comprise the application of a chemical treatment compound that imparts long-term biocidel protection to the timber. Such timber modification processes will be known to those of skill in the art. Suitable timber modification processes include:
  thermal modification
  resin impregnation
  oil impregnation
  acetylation; and
  furfurylation, The inventors have shown that thermally modified laminated timber boards exhibit an increase in the stability of the timber. Specifically, the inventors have shown (see example 5) that thermally modified laminated timber has better weathering characteristics than standard preservative treated laminated timber. Thermal modification is preferably carried out prior to lamination of the board to avoid potential issues with glue failure which can occur when glues are heated during thermal modification.

In addition to the increased stability of the timber, the thermal modification process provides a permanent colour change to the timber that penetrates throughout the timber. Laminated timber has the natural disadvantage of having a variety of different layers of wood being formed into a single board. As can be seen from FIG. 17, there is natural variation in the colour of each lamina. This is caused firstly by the variation in growth over the year with lighter rings (earlywood) being followed by latewood (darker rings). Secondly, the heartwood 5 is darker while the sapwood 6 is generally lighter in colour. This means that when laminated into a block and cut into boards to provide the appearance of a vertical grain orientation (as described below), the final product may have a striped effect that is undesirable for many applications. The inventors have found that when thermal modification of the layers is used, a more consistent colour is imparted to the different layers such that the contrast between them is decreased. This normalisation effect results in a laminated product with a consistent colour across the surface of the timber. Preferably the colour across the surface of the timber differs by less than L=10 or L=5 when assessed using the CIELAB colour space. If the resultant colour is acceptable to the user of the timber, no further colouring steps (as described below) may be needed. The inventors have also found that thermal modification decreases the visibility of the lamination glue lines that are present in laminated timber as described above.

It has been found that thermally modifying the timber results in timber of increased exterior durability and therefore allows the timber to be used without preservative treatment in many above ground applications. Preferably, the thermal modification is carried out at a temperature of between about 200° C.-260° C. Preferably the temperature is in a range of 200-260° C., or about 250° C., about 240° C., about 230° C., about 220° C., about 210° C., or about 200° C. In some embodiments, the temperature of the thermal modification may be as low as 180° C. The inventors have found that thermally modifying the timber at 200-240° C. imparts durability and stability that provides a suitable product for exterior applications (e.g. cladding, decking) in addition to a medium dark brown colour. 180° C.-200° C. does provide increased stability but only gives a lighter brown colour.

The duration of treatment at the preferred temperature of 200-240° C. is preferably 2-4 hours, or approximately 3 hours. In some embodiments, the treatment may be from 1-6 hours.

Prior to thermal modification at the temperatures outlined above, the timber is preferably dried to reduce moisture content to substantially 0%. In one embodiment, drying is achieved by the application of heat and optionally steam to heat the timber to 130° C. The duration of the drying step depends on the original moisture content of the timber.

In some situations, for example where the timber may be subject to termite attack, a chemical preservative may also be used. Thermally modifying the wood using a temperature in these ranges has been shown to reduce decay, (for example by the common brown rot fungus *A. xantha*), surface checking and weight loss as a result of wood degradation. Although wood can be thermally modified at lower temperatures, such as about 165° C., such temperatures are unlikely to increase the stability of the wood and will have minimal effect on the colour.

In one embodiment, thermal modification is carried out in a high pressure cylinder and involves a high pressure steam treatment of kiln dried timber. Preferably the kiln dried timber has a moisture content of about 16% or less.

A high pressure cylinder or kiln system that has been specifically designed for the elevated temperatures associated with thermal modification could also be used for the thermal modification step. Such thermal modification kilns, as offered, by way of example, by Tekmaheat or Stellac, would be well known to the skilled person in the art. Closed cell thermal modification processes are also suitable for use as a thermal modification process. Such closed cell systems, as offered, by way of example, by Wood Treatment Technology, would be known to those of skill in the art. In one embodiment, closed cell thermal modification is carried out at between 150° C. and 190° C., more preferably 160-180° C.

At 180 to 220° C. the look of Western Red Cedar is achieved. Elevated temperatures can result in a decrease in structural integrity of the timber. Thus, while higher temperatures may result in a more desirable darker colour, the resultant loss of structural integrity dictates the final applications for which the timber can be used. Thermal modification is preferably carried out over a period of between about 2 days and about 4 days, more preferably over 3 days to give a completely coloured and dried product (approximately 6-8% moisture content).

In one embodiment, thermal modification of the timber provides preservative properties to the timber. In particular, the thermally modified wood has increased resistance to degradation by fungi, insects, bacteria and/or algae. The use of thermal modification instead of a chemical preservative compound treatment provides advantages to the user including:
  reduced cost of treatment and preservative compounds;
  reduced toxicity to animal/human health;

reduced toxicity to other species and therefore lower environmental impact.

Further methods of timber modification may be used to achieve colouring and/or other desirable properties such as an increase in surface hardness, stability and/or durability. Suitable treatments include acetylation, furfuryl modification, resin impregnation and oil impregnation.

Timber modification by way of acetylation involves the reaction of a chemical reagent with the wood structural polymeric constituents to result in the formation of a covalent bond between the reagent and the wood substrate. The product obtained contains acetyl groups bonded to hydroxyl (OH) sites in the wood cell wall. Although the reaction can take place using ketene, acetic acid, or acetyl chloride, the most useful process is acetylation of wood due to reaction with acetic anhydride. Methods for the acetylation of wood will be known to those of skill in the art. Acetylated wood's durability is Class 1, which matches and in some cases exceeds the durability of many hardwood species. Durability is assessed by measuring weight loss over time in exposed conditions.

Furfuryl modified wood undergoes a process known as furfurylation which uses furfuryl alcohol to modify the cell structure of the wood and thereby increase surface hardness, stability and durability. Colour may also be modified by using this technique. Methods to achieve furfurylation of wood are known to those of skill in the art.

Resin impregnation involves using pressure to force organic or non-organic-based resins e.g. urea formaldehyde or a combination of urea and starch-based emulsion or pine resin into the wood. This will increase the stability, durability and/or surface hardness characteristics of the timber. Colour may also be modified by using this technique.

Oil impregnation involves the introduction of oil to a timber via vacuum or pressure treatment processes. A variety of oils may be used including linseed, olive, pine or a mineral oil. The oil treated wood shows greater resistance to fungal decay, and has better dimensional stability than untreated wood. Methods for oil impregnation of wood are known in the art and skilled persons will appreciate such methods. Oil impregnation includes the use of oil-heat treatment processes. The use of oil-heat treatment has utility in modifying the timber and imparting stability and aesthetic characteristics. Oil impregnation allows the fast application of the heat to the wood, and excludes air during the treatment phase thus reducing the scope for strength loss that can occur in other heat treatment systems.

In certain embodiments, the present invention involves the colouring the timber with a desirable market colour. For some applications, it is desirable to colour the timber throughout its cross-section. Among other methods, this can be done by (1) thermal modification at a selected end point temperature to give the desired colour or (2) by use of a chemical colourant that is added during the preservative treatment process. Other timber modification methods that can provide colouring include furfurylation and resin impregnation. It is also possible to use a preservative having inherent colour due to its chemistry. Combinations of colouring options can also be used. In particular, having colour throughout means that if the timber needs to be sanded back for remediation work, the colour will be the same throughout. This remediation ability provides a particular benefit to the user.

In one embodiment, the step of colouring the timber is achieved by carrying out the step of treating the timber using thermal modification. In this embodiment, the step of colouring the timber is achieved concurrently with the step of thermal modification of the timber. Further colouration may be included if desirable.

Thermal modification changes the colour of timber throughout the timber. The end colour achieved is dependent mainly on the end-point temperature at which thermal modification is carried out. Thus, the higher the end-point temperature, the darker the wood becomes throughout. Variations in colour can be achieved by altering the end-point temperature and uniform colour throughout the timber can be achieved. One advantage of being able to control the colour is that the timber can be made to mimic the appearance of other species of timber. This allows the end user to achieve a desired appearance for exterior applications. The lightness of the thermally modified timber is measured by the L-value (lightness value) of the CIELAB colour space as specified by the International Commission on Illumination. Measurement of the L-value can be carried out by methods known to those of skill in the art of colorimetry using appropriate colorimeters such as a Minolta Chromameter CR-400, In particular embodiments, the thermal modification reduces the lightness L-value of the timber to less than 60 or, for a darker colour less than 50. In other embodiments, the L-value is between 30 and 60 (e.g., 30 . . . 35 . . . 45 . . . 55 . . . and 60). In certain embodiments, for a three hour thermal modification treatment time at 200° C., the L-value is 58. In other embodiments, for a three hour thermal modification treatment time at 220° C., the L-value is 47. In some embodiments for a three hour thermal modification treatment time at 240° C., the L-value is 34. In one embodiment, the thermal modification temperature is between 200° C. and 240° C. and the L-value is between 30 and 62.

The use of a chemical colourant to colour the wood throughout its whole cross-section typically involves the impregnation of a dye or pigment to the timber. The dye or a pigment is preferably naturally occurring and must be chemically compatible with any preservative treatment being used. Use of a colourant ensures a particular colour is achieved for the final wood product. The colourant, if used, may be applied concurrently with a preservative, and if desired a suitable wetting agent (surfactant system) can be used to assist penetration. The wood may be coloured by thermal modification, addition of a colourant, by use of a preservative with inherent colour, or other colouring methods, prior to or subsequent to lamination, or by incorporating the colourant into a pre-coating of the final product.

Chemical preservative treatment compounds may be used in addition to thermal modification and can be either a solvent-based treatment or a water-based treatment. Examples of suitable solvent-based preservatives include, TBTN, TBTO, Copper Napthenate, tri-azoles such as 1-[[2-(2,4-dichlorophenyl)-4-propyl-1,3-dioxolan-2-yl]methyl]-1,2,4-triazole (Propiconazole) and (RS)-1-(4-chlorophenyl)-4,4-dimethyl-3-(1,2,4-triazole-1-yl-methyl)pentan-3-ol (Tebuconazole) and termidicide preservatives such as 3-phenoxybenzyl-(1 RS)-cis,trans-3-(2,2-dichlorovinyl)-2,2-dimethylcyclopropane carboxylate (Permethrin) and/or N-[1-[(6-chloro-3-pyridyl)methyl]-4,5-dihydroimidazole-2-yl] nitramide (Imidacloprid). Examples of suitable water based preservatives include CCA, ACQ and Copper Azole. It is also an option to use a preservative that has inherent colour due to its chemistry (e.g. ACQ) if that meets colour requirements.

Chemical preservative compounds are effective at limiting wood degradation by their biocidal (typically fungicidal or insecticidal) properties. However, they do have limitations in that the compounds used are, by their nature, toxic to many organisms and may have detrimental effects on animal/human health, especially following prolonged exposure.

The process of colouring the wood by use of a chemical colourant incorporated into the preservative treatment may be carried out either before or after lamination of individual boards. Where the wood is coloured by thermal modification, a subsequent preservation step may be carried out either before or after lamination of individual boards. The order is dependent on the nature of the preservative treatment. For example, where the preservation step involves high water uptake, the timber will have to be subsequently re-dried before it can be laminated. Conversely, where the preservation step is solvent based or involves low water uptake, the timber may be laminated prior to the preservative treatment being undertaken. If necessary, surfactant systems, as would be known in the art, can be used to ensure effective penetration of preservatives or colourants.

Use of a colourless glue or an appropriately tinted glue alone is often not enough to sufficiently mitigate the appearance of glue lines to meet some customer requirements. Accordingly, although thermal modification has been shown by the inventors to provide some degree of disguising of the glue lines, some unsightly glue lines (or join lines) may remain evident in the surface of the timber following lamination. In one embodiment, in order to create a higher quality product, it is desirable that these glue lines are obscured or disguised by a surface finishing technique. One method of surface finishing appropriate to reduce the visibility of the glue lines is the cutting of striations into the surface of the timber at predetermined intervals and depths. Striations may have a width and depth of 1 mm or more and run parallel to the glue lines such that they lie along the glue lines themselves. In a particular embodiment of the present invention, striations of 1 mm to 5 mm are cut into the timber surface. The pitch between adjacent striations may be about 3 mm and the raised surface between adjacent striation channels may be approximately 2 mm. The striations may lay along individual glue lines. Striations may be formed by any suitable process. The subsequent use of a surface finishing technique to produce the required striations on the surface of the wood, preferably band sawn processing, micro-reed processing or brushing techniques, results in a product which closely mimics the aesthetic and stability characteristics of high performance timbers referred to herein, such as Western Red Cedar and Kwila.

It is advantageous to provide a laminated board with striations of less than 1 mm to provide a suitable aesthetic appearance. The surface finishing process could be used to provide wider striations if desired, but preferably of no more than about 2.5 mm in width, to disguise (i.e. reduce the visibility of) the lamination glue lines in the laminated board. In addition, it would be useful for the laminated product to be able to mimic the look of species including Western Red Cedar, Kwila, Teak, Vitex, Ipe, Balau, Bankirai or other commonly used timbers, when supplied for appropriate applications. It has been found that the use of striations, when used in conjunction with the other steps of the invention, provides a surprisingly effective mimicking effect. Such an effect provides a desirable product to the market for use in similar applications to other species of timber, such as those described above.

With respect to aesthetics, in cladding applications, a brushed or band sawn look is often desired, and structural integrity is less of a concern. Typically, the brushing technique is employed as the non-uniform appearance of multiple striations is appealing. In contrast, in decking applications, the micro-reed process will likely be more popular although the brushing look and even the band sawn look may be utilised. Striations may be added to any surface of the board and are typically added to exposed surfaces to provide aesthetic appeal. Preferably, the striations are added to the face of the board.

The surface of the timber can thus be finished using striations that are produced by:
  (i) a band-sawn effect, preferably applied during sawing of the laminated block into individual boards
  (ii) a micro-reed effect, preferably applied during profiling of the boards in a timber planar operation
  (iii) a brushed effect, preferably applied using a metallic brushing tool that is a standalone piece of equipment or has been adapted to be used in a standalone timber planar operation.

The inventors have found that use of striations of less than 1 mm in width has a particular advantage in allowing a mimicking of the appearance of other species of timber when used in conjunction with the other processes of the invention.

Micro-reed process and brushing techniques are capable of forming striations of less than 1 mm in width and therefore both provide a means of producing a quality timber product with an aesthetically pleasing surface finish where the glue lines are camouflaged. The use of finer striations also avoids the need to ensure that individual striations lie along individual glue lines. These striations typically run parallel to the lamination glue lines.

The micro-reed effect is typically applied during profiling of the boards in a timber planar operation. The profiling is done using knives designed to cut a specific "micro-reed" pattern which comprises ridges and bumps. These knives are fitted into the profiling machine to obtain the desired surface finishing effect. Preferably, the profiling and addition of the micro-reed effect is obtained in a single operation. Preferably the ridges and bumps are of approximately 0.2-1.0 mm in width and have a length that is longer than the width wherein the length is aligned substantially lengthwise along the board.

The brushing technique is randomised in the sense that it involves the use of a metallic or nylon brushing tool and results in non-uniform striations. This tool is adapted to be used in a timber planer operation such that the surface of the board contacts the brushing tool as it passes beneath it, leaving a brushed appearance on the board surface. The brushing tool can also be used as a standalone piece of equipment.

Striations can also be applied that are largely perpendicular to the glue lines and the most common method would be to create a band sawn effect obtained during cutting with a band saw. These are less effective at directly covering the glue line, but do create a surface that is more aesthetically pleasing than the bare exposed lamination glue lines and will be desirable in some applications where a more rustic look is required.

The inventors have found that when the wood is coloured throughout by thermal modification and laminated to provide the appearance of a vertical grain orientation with optional surface finished with striations (such as a micro-reed, brushed or band sawn appearance), a timber product is produced which mimics the appearance of more expensive timbers, shows enhanced stability characteristics, and has a lamination glue line that less visible. The appearance and stability of timber such as Western Red Cedar, Kwila, Teak, Vitex, Ipe, Balau, and/or Bankirai and other hardwoods can be obtained that was previously unobtainable for soft woods when used as a single solid board.

The ability to mimic such characteristics of other species of timber using *radiata* or other low value wood species and cuts is of particular advantage. In addition, the laminated wood product can be subjected to remedial work (e.g. sanding) without loss of colour thus adding to the aesthetics and usefulness of the product.

The timber processed according to the methods of the present invention can be used in cladding and/or decking applications in place of more expensive hardwoods as it can give the appearance of a high quality timber product which has not been laminated. The final application is dependent only on the structural integrity requirements and aesthetic look the customer desires. Thus, the method of the present invention provides a timber product which mimics the appearance of another timber, for example Western Red Cedar, Kwila, Teak, Vitex, Ipe, Balau and/or Bankirai, and has enhanced stability.

In another aspect the present invention provides a method of processing timber which enhances the stability and aesthetic characteristics of the timber in a more simplified and cost effective manner by the addition of a coating to the surface of the timber. This method includes the steps of:
  a. thermal modification; and lamination with a colourless or tinted glue to produce the appearance of a vertical grain orientation on a face of the timber; and
  b. surface finishing; and
  c. colouring the surface of the timber in final form through addition of a colourant (also known as a tint) in a water-based coating, prior to installation ("pre-coating").

Coatings may also be applied to any of the previous embodiments of the invention described herein.

Coatings are normally clear oil-based or water-based chemical formulations that are applied manually to timber decks or cladding post installation to act as a barrier against water and sunlight (UV) when timber is used in an exterior situation. This prevents the timber from weathering or "silvering off" and maintains the original look of the timber. Coatings are transparent so that the underlying grain structure of the wood is still visible, unlike a painted timber board.

Pre-coating of timber boards is undertaken in a factory setting prior to delivery and installation that allows a more uniform application. The coating is applied using purpose-designed equipment such as a spray system or vacuum coater. During this process it is possible to tint or colour the coating formulation to achieve a coloured product.

Coating of timber boards has limitations in that the coating (and hence the colour) is only applied to the surface and will wear off after time in service. This means re-coating in-situ will be necessary if the end user wishes to maintain the look and if a similar colour is required the chemical formulation with matching colourants will need to be made available at a retail level to the end user.

This aspect of the present invention is particularly useful for consumers who desire a coated finish to their decking or cladding. The combination of thermal modification, lamination with the stated glues and colourant in a water based coating being able to provide an alternative to more expensive timber such as hardwood options. Optional surface finishing techniques as described herein can also be used to enhance the timber product further.

EXAMPLES

Example 1: Steamed Laminated, Brushed *Radiata* Pine Cladding

Clear grade green boards of 100 mm×25 mm were sawn from 100% sapwood and were steamed at 165° C. for 4 to 6 hours. The boards were then kiln dried using conventional medium temperature kilns with a typical *radiata* pine drying schedule. A preservative treatment was then carried out using a solvent-based LOSP process to H3.1 clear. The boards were blanked to 100 mm×23 mm using a conventional planing machine and were then laminated into a block with a clear polyurethane exterior-grade adhesive (Henkel Purbond) taking care to ensure the grain of each board was orientated in the flat-sawn direction. The resultant block was sliced, using a conventional band saw, into a number of nominal 150 mm×25 mm boards that exhibited a vertical grain appearance. The boards were profiled using a conventional planing machine using a band sawn finish (FIGS. 5 to 8). The boards were then coated using a vacuum coater with an Akzo Nobel, water-based polyurethane.

Assessment of Timber for Aesthetic Qualities

The samples of timber discussed above were subjected to qualitative analysis of the characteristics described below. The visibility of glue lines and colour contrast were compared to a true vertical grain orientation timber sample. The colour richness comparison was assessed in comparison to a Western Red Cedar board:

| Feature | Treated sample |
| --- | --- |
| Visibility of glue lines (1 = least visible, 5 = most visible) | 4 |
| Colour contrast between laminated layers (1 = least contrast, 5 = most contrast) | 4 |
| Colour richness (1 = least similar, 5 = most similar) | 3 |

This test shows that despite providing a suitable laminated product, the visibility of glue lines and contrast between the laminated layers lowers the overall aesthetic qualities of the treated board. In addition, the colour richness of the board is not close to a more expensive species such as Cedar.

Example 2: Preservative Coloured, Laminated, Profiled *Radiata* Pine Decking

Clear grade green boards of 150 mm×35 mm were sawn from 100% sapwood and were kiln dried using conventional medium temperature kilns with a typical *radiata* pine drying schedule. The boards were then preservative treated using a water-based process with ACQ to H3.2. The treated boards were blanked to 150 mm to 32 mm using a conventional planing machine and were subsequently laminated into a block with a clear polyurethane exterior-grade adhesive (Henkel Purbond) taking care to ensure the grain of each board was orientated in the flat-sawn direction. The block was sliced, using a conventional band saw, into a number of nominal 150 mm×25 mm boards that exhibited a vertical grain appearance. The boards were then profiled using a conventional planing machine with attachment to brush striations of less than 1 mm in width into the surface of the boards (FIGS. 1-4).

Assessment of Timber for Aesthetic Qualities

The samples of timber discussed above were subjected to qualitative analysis of the characteristics described below.

The visibility of glue lines and colour contrast were compared to a true vertical grain orientation timber sample. The colour richness comparison to a more expensive hardwood was assessed in comparison to a Western Red Cedar board:

| Feature | Treated sample |
|---|---|
| Visibility of glue lines (1 = least visible, 5 = most visible) | 3 |
| Colour contrast between laminated layers (1 = least contrast, 5 = most contrast) | 3 |
| Colour richness (1 = least similar, 5 = most similar) | 3 |

This test shows that despite providing a suitable laminated product, the visibility of glue lines and contrast between the laminated layers still compromises the overall aesthetic qualities of the treated board. Although the appearance of the glue lines and contrast is improved when compared to LOSP treatment, the overall aesthetics of the treated timber is lacking when compared to true vertical grain timber. In addition, the colour richness of the board is not close to a more expensive species such as cedar.

Example 3: Laminated, Profiled, Pre-Coating Coloured *Radiata* Pine Decking

Clear grade green boards of 150 mm×35 mm were sawn from 100% sapwood and were kiln dried using conventional medium temperature kilns with a typical *radiata* pine drying schedule. The boards were then preservative treated using a water-based process with ACQ to H3.2. The treated boards were blanked to 150 mm to 32 mm using a conventional planning machine and were subsequently laminated into a block with a clear polyurethane exterior-grade adhesive (Henkel Purbond) taking care to ensure the grain of each board was orientated in the flat-sawn direction. The block was sliced, using a conventional band saw, into a number of nominal 150 mm×25 mm boards that exhibited a vertical grain appearance. The boards were then profiled using a conventional planing machine with attachment to brush striations of less than 1 mm in width into the surface of the boards. Finally, the boards were coated using a vacuum coater with Akzo Nobel, water-based polyurethane with a tint added to give a different surface colour to the board than the natural colour found with ACQ (as Example 2 above).
Assessment of Timber for Aesthetic Qualities The samples of timber discussed above were subjected to qualitative analysis of the characteristics described below. The visibility of glue lines and colour contrast were compared to a true vertical grain orientation timber sample. The colour richness comparison to a more expensive hardwood was assessed in comparison to a Western Red Cedar board:

| Feature | Treated sample |
|---|---|
| Visibility of glue lines (1 = least visible, 5 = most visible) | 2 |
| Colour contrast between laminated layers (1 = least contrast, 5 = most contrast) | 2 |
| Colour richness (1 = least similar, 5 = most similar) | 4 |

This test shows that the visibility of glue lines and contrast between the laminated layers is improved when using a tinted coating different to the natural colour of the board. The overall aesthetics of the board are improved with a better rating for colour contrast and similarity to the overall aesthetic qualities of the treated board. Although the contrast is improved when compared to LOSP or ACQ treatment alone, the colour richness and visibility of glue lines is still lacking when compared to true vertical grain timber or the Western Red Cedar sample.

Example 4: Use of a Colourant, Co-Formulated with a Preservative

Trial using treatment solution including a micronized pigment (0.1% hostafine blue pigment—CLARIANT) using vacuum/pressure techniques to show penetration effects.

Most pigments tend to have poor penetration in wood due to the filtering effect of the closely packed fibres and therefore a surfactant system with suitable wetting properties was used to carry the active ingredients into the timber. The surfactant system also assisted to maintain the actives in a stable suspended condition in the treatment solution in the presence of timber extractives and under plant conditions.

The surfactant system used in this trial comprised a proprietary combination of:
 1. An amphoteric surfactant; and
 2. A non-ionic surfactant.
Timber Kiln dried *radiata* pine samples were used, these were 20 mm thick decking boards and 11 mm thick sarking boards. The boards were sealed on their end grain using 2 coats of Resene Quick dry acrylic primer.
Trial Conditions

| Action | Pressure (Kpa) | Duration (minutes) |
|---|---|---|
| Initial vacuum | −80 | 5 |
| Treatment chamber flooding | Solution drawn into chamber under vacuum | 1 |
| Soak | 0 | 2 |
| Treatment chamber draining | Atmospheric pressure-gravity | 1 |
| Final Vacuum | −80 | 5 |

Foam Control

There were no signs of foam control problems even under vacuum and high agitation of the treatment solution.
Solution Uptake An average uptake of 230 liters/cubic meter was achieved.
Penetration of Dye Samples were cross cut and split using a chisel, full penetration of the pigment to a level of at least 10 mm was evident (full penetration of 20 mm boards). Penetration on dense annular rings and heartwood was lower than in other parts of the timber but 10 mm was evident.
Conclusion Hostafine pigments are capable of deep penetration into timber using vacuum/pressure techniques, preferably together with a suitable wetting agent. Timber products produced by methods of the invention that mimic the look of Cedar and which are suitable for applications such as cladding and decking can be seen in FIGS. 1 to 8. The complete penetration of the colour can be seen in FIGS. 1 and 5.

Example 5: Exterior Weathering Characteristics of Laminated Timber

Weathering characteristics were compared between thermally modified and preservative treated timber. All timber was laminated to produce the appearance of a substantially vertical grain.

Methodology

"Clears" grade timber was thermally modified according to the following method:
  a. A kiln (Mahild) was slowly elevated in temperature to 130° C. using heat and steam until the moisture content of the wood was essentially 0%;
  b. The wood in the kiln was then heated further until it reached 220° C. The Kiln was held at the modification temperature for 3 hours;
  c. The kiln was allowed to cool and the wood was reconditioned with steam to 6-7% MC. Once cool enough the wood was extracted from the kiln.

H3.2 alkaline copper quaternary (ACQ) kiln dried preservative treated *radiata* pine boards were used as a comparator. Both sets of treated timber with a predominantly flat sawn grain orientation were machined and laminated into 150×160 mm blocks with Purbond HBS polyurethane adhesive according to AS/NZS1328 glue lamination standard. After glue cure, the boards were then band sawn perpendicular to the glue line into 150×23 boards resulting in the appearance of a substantially vertical grain (VG) orientation. The lightness L-value of the thermally modified boards was visually assessed against a colour palette for pine and expressed in terms of the CIELAB Color Space.

The boards were then machined into weatherboard profiles with band sawn faces. 1.2 m Length samples were cut randomly from long length pieces.

Water based and oil based semi-transparent stain was applied to the boards-face, back and ends The boards were installed onto exposure racks at a test site with the following specifications:
  Fixed with stainless steel flat head ring shank nails in the same manner
  North facing at 45 degree angle
  Proximity to native bush, marsh lands and sea spray The boards were exposed and the weather conditions were recorded at regular intervals. The test racks were visited approximately 6 months after installation and then at approximately 6 month intervals after this. Aesthetic assessment of the boards was also carried out at the start of the trial.

Results

Assessment of Timber for Aesthetic Qualities

The timber had an L-value of approximately 47. The samples of timber discussed were subjected to qualitative analysis of the characteristics described below. The visibility of glue lines and colour contrast were compared to a true vertical grain orientation timber sample. The colour richness comparison to a more expensive hardwood was assessed in comparison to a Western Red Cedar board:

TABLE 1

| Feature | Laminated ACQ sample | Laminated thermally modified sample |
|---|---|---|
| Visibility of glue lines (1 = least visible, 5 = most visible) | 3 | 4 |
| Colour contrast between laminated layers (1 = least contrast, 5 = most contrast) | 3 | 1 |
| Colour richness (1 = least similar, 5 = most similar) | 3 | 5 |

TABLE 1-continued

| Weather conditions recorded Temperature and Humidity | | |
|---|---|---|
| Highest Temperature | 30.6° C. | at 4:00 p.m. on day 291 |
| Lowest Temperature | 0.1° C. | at 6:13 a.m. on day 95 |
| Highest Dew Point | 24.2° C. | at 8:18 a.m. on day 309 |
| Lowest Dew Point | −1.5° C. | at 12:20 p.m. on day 76 |
| Lowest Wind Chill Temperature | 0.1° C. | at 6:13 a.m. on day 95 |
| Highest Heat Index | 35.2° C. | at 5:30 p.m. on day 294 |
| Highest Humidity | 100% | at 2:42 a.m. on day 2 |
| Lowest Humidity | 30% | at 12:55 p.m. on day 219 |
| Highest Daily Range | 16.4° C. | on day 51 |
| Lowest Daily Range | 0.4° C. | on day 304 |
| Rainfall | | |
| Highest Rain Rate | 79.1 mm/hr | at 7:16 a.m. on day 146 |
| Highest Hourly Rainfall | 309.6 mm | at 12:00 a.m on day 303 |
| Highest Daily Rainfall | 35.4 mm | on day 45 |
| Wind | | |
| Highest Wind Gust | 64.8 km/h | at 10:21 a.m on day 37 |
| Highest Wind Speed Average | 50.0 km/h | at 9:25 p.m. on day 227 |
| Pressure | | |
| Lowest Pressure (sl) | 983.4 mb | at 5:23 p.m. on day 172 |
| Highest Pressure (sl) | 1039.4 mb | at 8:57 a.m. on day 106 |

| Assessment of lamination integrity | | |
|---|---|---|
| Treatment | Day of assessment | Lamination integrity |
| ACQ treated | 193 | 4 |
|  | 407 | 2 |
| Thermally modified | 193 | 5 |
|  | 407 | 5 |

Lamination integrity was assessed on a 5 point scale as follows:
5 = No evidence of delamination
4 = Minor regions of partial delamination (less than 2 cm)
3 = More extensive partial delamination (less than 10 cm) some fibre tear (wood fibre splitting from the rest of the timber)
2 = Extensive delamination (greater than 10 cm sections) and extensive fibre tear
1 = complete delamination and joint failure Laminated ACQ Observations:

At the first visit (day 193), there was evidence of glue delamination at the ends of the ACQ boards. During further visits partial delamination (where wood fibre pulls away from the rest of the board at the glue line) was observed occurring in the middle of the boards. The partial delamination developed quite quickly and then stopped developing further after approximately 12-18 months exposure. FIGS. 11 to 14 show sample boards with partial delamination.

Figure 1:
FIGS. 1 to 4 show the appearance of laminated *radiata* pine boards prepared according to the processes of the invention after brushing.
Figure 2:
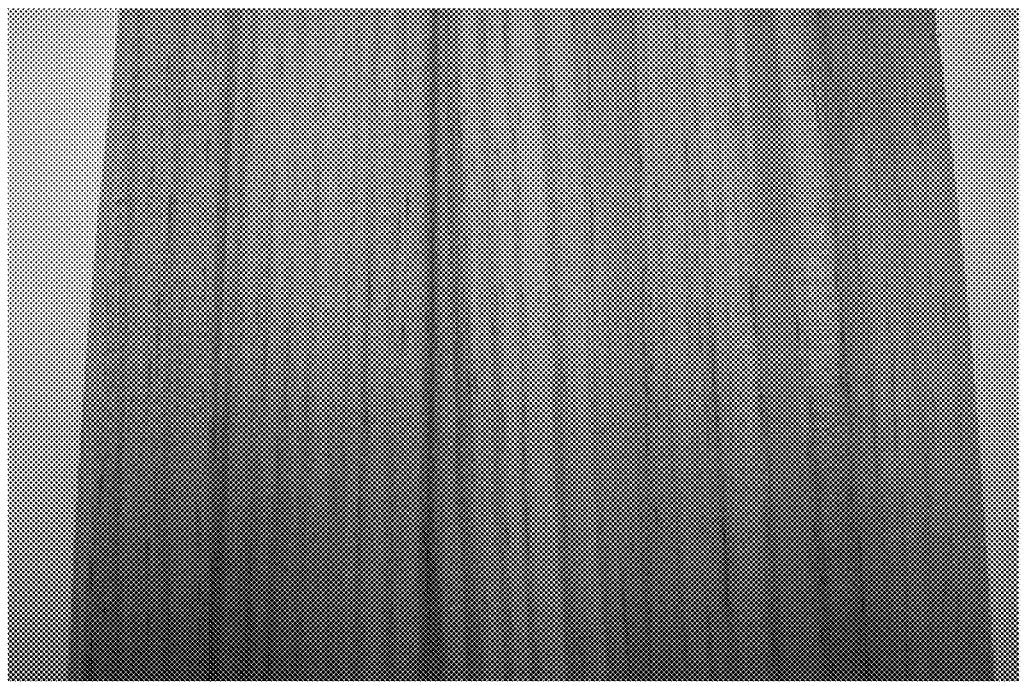
Figure 3:
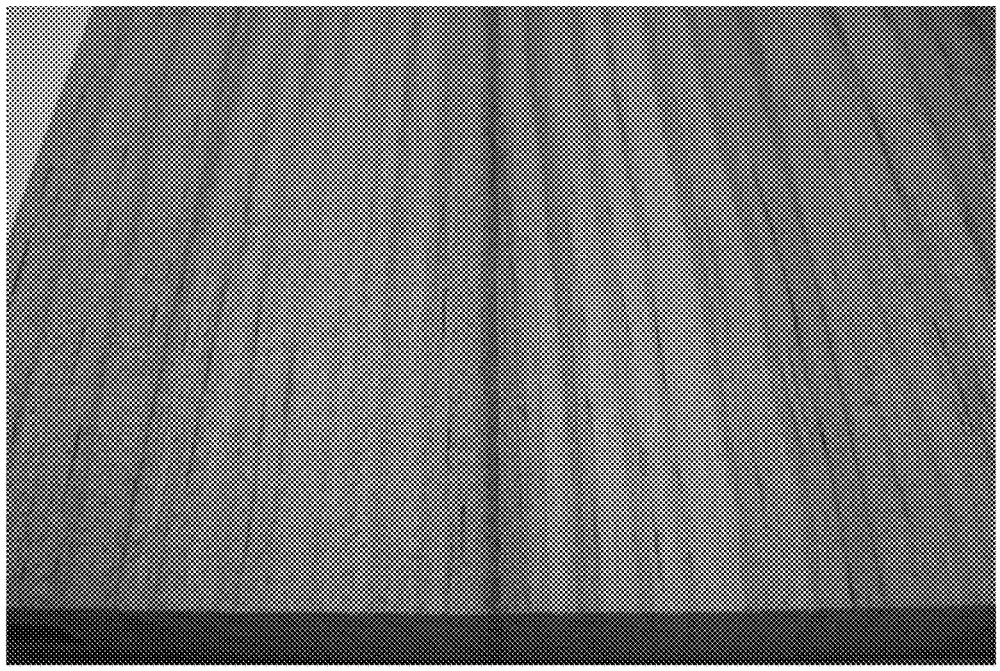
Figure 4:
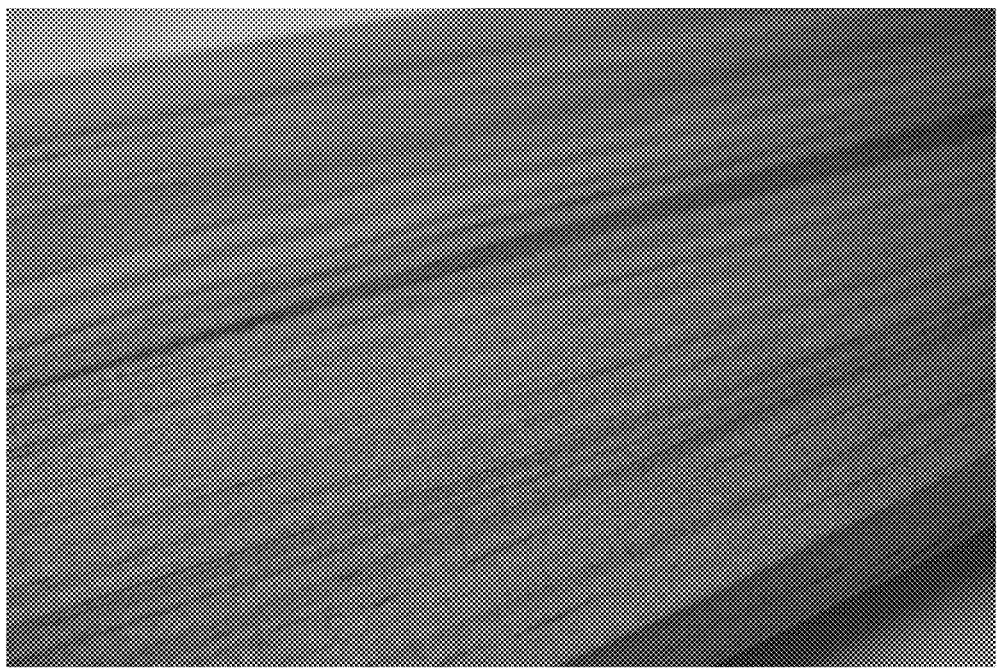
Figure 5:
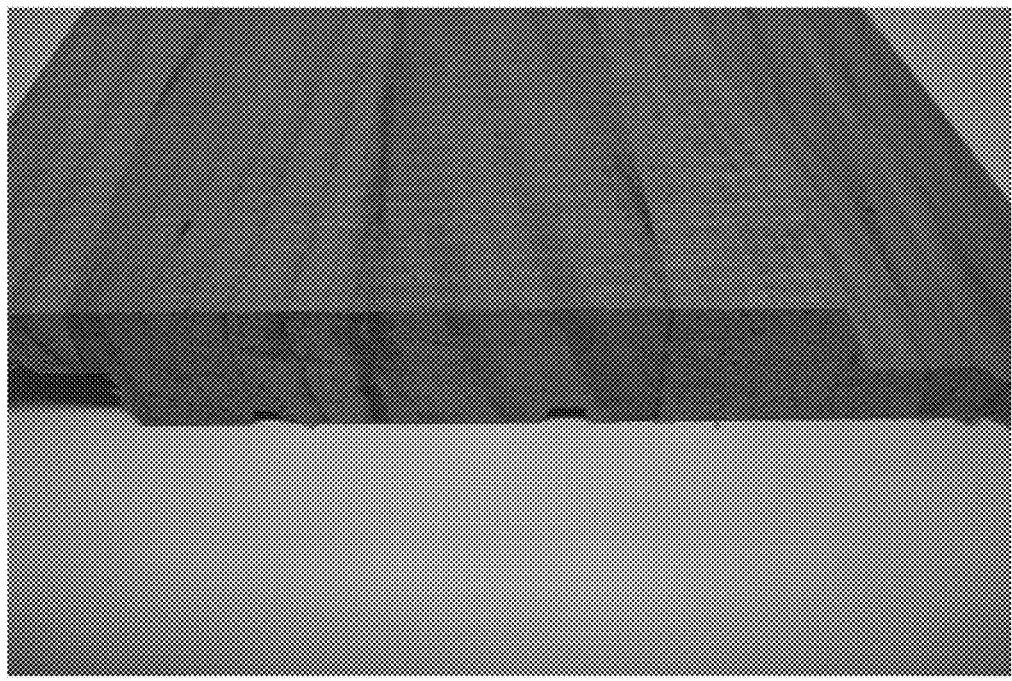
FIGS. 5 to 8 show the appearance of laminated *radiata* pine boards prepared according to the processes of the invention with a band sawn finish.
Figure 6:
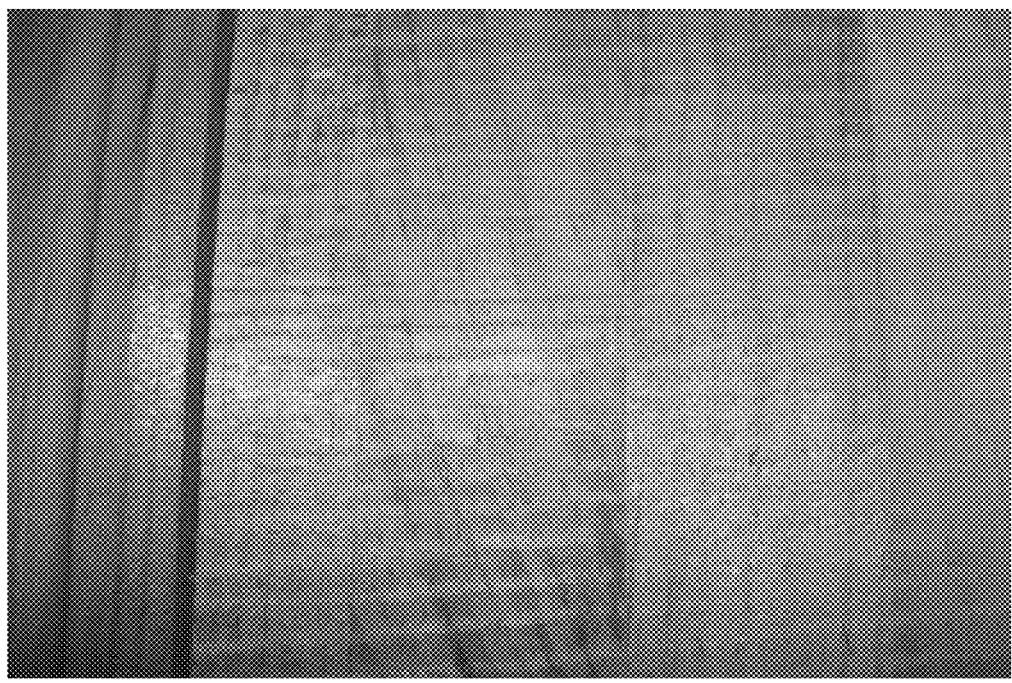
Figure 7:
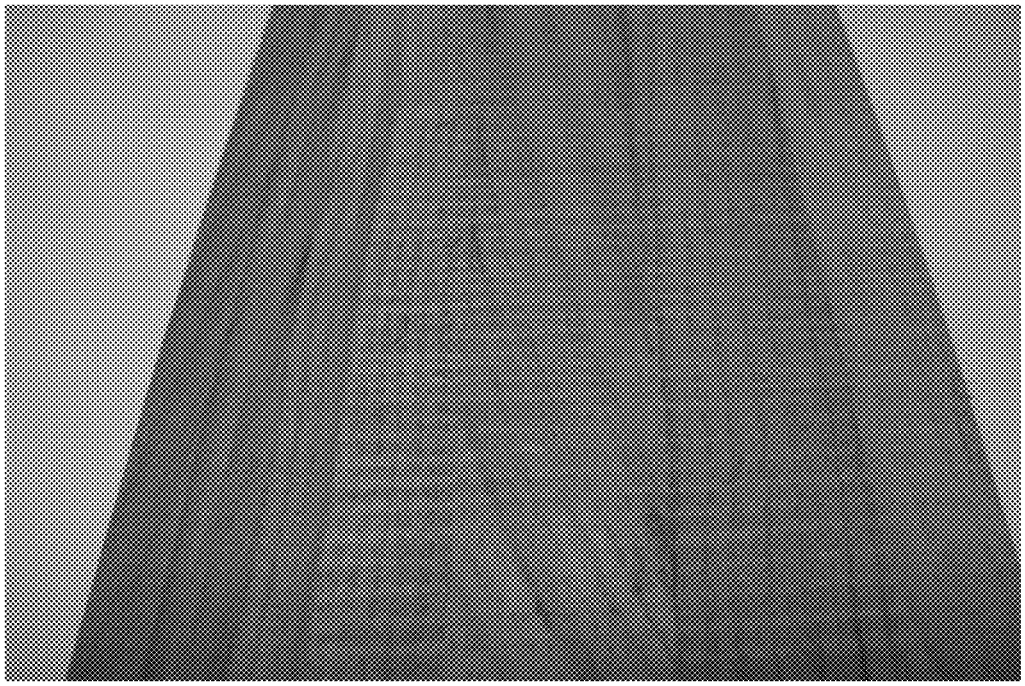
Figure 8:
Figure 9:
FIG. 9 shows exposure test site and test racks.
Figure 10:
FIG. 10 shows coated thermally modified timber boards installed on test racks.
Figure 11:
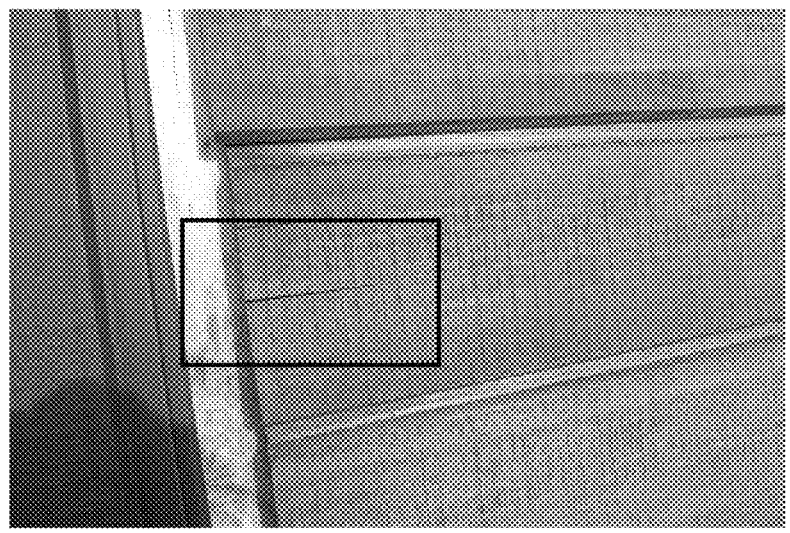
FIG. 11 shows coated ACQ boards 6 months after the start of the exposure trial with delamination at ends evident
Figure 12:
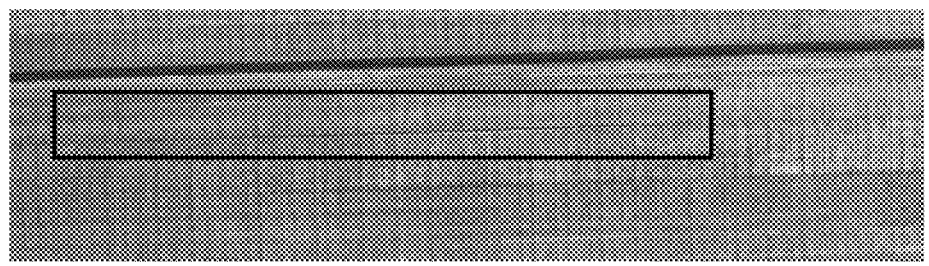
FIG. 12 shows coated ACQ boards 12 months after the start of the exposure trial with partial delamination evident in the middle of the board.
Figure 13:
FIG. 13 shows coated ACQ boards 12 months after the start of the exposure trial with partial delamination evident in the middle of the board.
Figure 14:
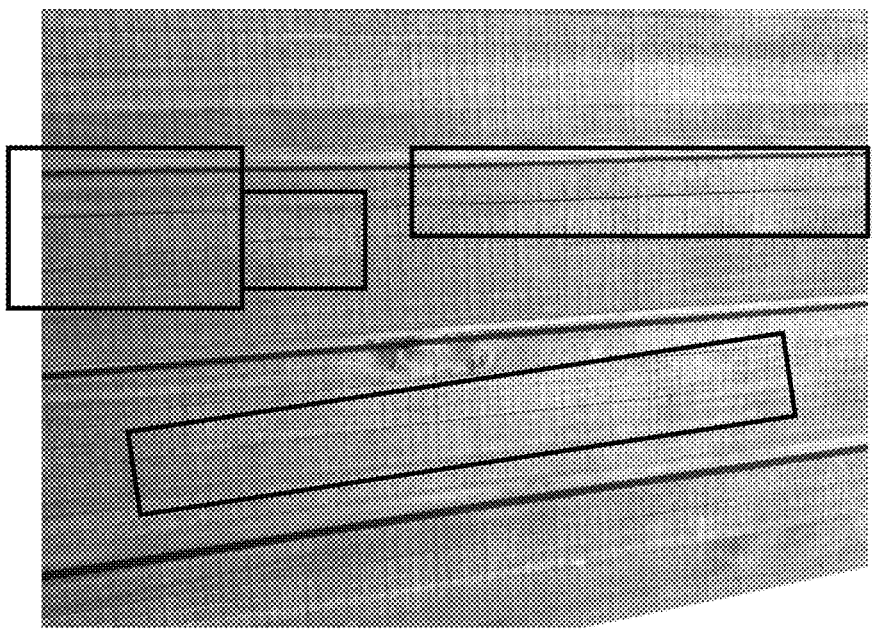
FIG. 14 shows coated ACQ boards 12 months after the start of the exposure trial with partial delamination evident.
Figure 15:
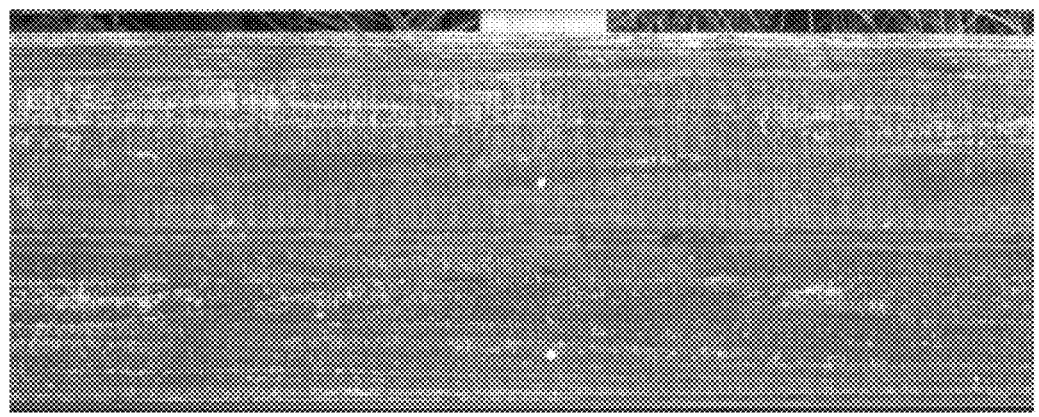
FIGS. 15 and 16 show coated thermally modified timber boards after 24 months exposure—the coating has started to fail, but the substrate is stable with no delamination evident.
Figure 16:

Laminated Thermally Modified Timber Observations:

After 24 months' exposure, the TMT substrate was virtually perfect with no delamination evident. Some minor 'ring failure' (cracking at the growth rings) was observed, but no delamination. FIGS. 15 and 16 show sample boards with no evidence of delamination.

Conclusions

After three years weathering exposure there was a marked difference in weathering performance between laminated vertical grain TMT and laminated vertical grain ACQ boards.

Pulling away of timber edges at the glue lines (delamination) was virtually eliminated by substituting with TMT.

In addition, in thermally modified timber, the visibility of glue lines was reduced, the contrast between layers was reduced and the colour richness was increased. These results indicate that the overall aesthetics of the timber were improved in concert with the stability.

The entire disclosures of all applications, patents and publications cited above and below, if any, are herein incorporated by reference. Reference to any prior art in this specification is not, and should not be taken as, an acknowledgement or any form of suggestion that that prior art forms part of the common general knowledge in the field of endeavour in any country in the world. Wherein the foregoing description reference has been made to integers or components having known equivalents thereof, those integers are herein incorporated as if individually set forth. Various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

We claim:

1. A method of using timber boards with a substantially flat grain to produce a laminated board with enhanced dimensional stability and aesthetic characteristics, the method comprising:
   a) taking at least two timber boards originally cut from a tree in a substantially flat grain orientation;
   b) laminating a flat grain face of each board together by gluing to produce a laminated block; and
   c) cutting the laminated block substantially perpendicular to the grain to produce laminated boards comprising a front and back face having the appearance of a substantially vertical grain and showing at least one glue line,
   wherein the method further comprises treatment and colouring of the timber boards, laminated block or laminated boards by thermal modification, and
   wherein the method does not include the step of treating the timber with a chemical preservative compound.

2. The method of claim 1, further comprising the step of surface finishing comprising the addition of one or more striations to the front or back face of the laminated boards.

3. The method of claim 2, wherein the addition of one or more striations reduces visibility of at least one glue line between the laminated layers.

4. The method of claim 1, wherein thermal modification reduces the visibility of at least one lamination glue line.

5. The method of claim 1, wherein thermal modification is carried out at between 200° C. and 240° C.

6. The method of claim 1, wherein thermal modification is carried out at a temperature between 200° C. and 240° C. for a period of between 2 and 4 hours.

7. The method of claim 1, wherein colouring the timber is further achieved by at least one of:
   i) furfuryl modification;
   ii) resin impregnation; and
   iii) use of a colourant.

8. The method of claim 2, wherein surface finishing comprises the addition of striations selected from the group consisting of less than 2.5 mm width, less than 1 mm width, approximately 2.5 mm width and approximately 1 mm width.

9. The method of claim 1, wherein a lightness L-value of the board is reduced by thermal modification to less than 62 as measured by the CIELAB Color Space.

10. The method of claim 1, wherein contrast in lightness between layers in the laminated board is less than L=10 when assessed using the CIELAB colour space.

11. The method of claim 2, wherein the striations are added to the surface of the timber by at least one of:
    i) a band-sawn effect;
    ii) a micro-reed effect; or
    iii) a brushed effect.

12. The method of claim 1, wherein the timber comprises a softwood timber species.

13. The method of claim 1, wherein the timber comprises *radiata* pine, southern yellow pine, scots pine, ash, maple, beech, birch, aspen or rubber wood.

14. The method of claim 1, wherein the timber is coloured to mimic the colour of a different wood.

15. The method of claim 14, wherein the different wood is Western Red cedar, Kwila, Teak, Vitex, Ipe, Balau or Bankirai.

* * * * *